(12) United States Patent
Liu

(10) Patent No.: US 12,253,771 B2
(45) Date of Patent: Mar. 18, 2025

(54) DISPLAY PANEL AND DISPLAY DEVICE

(71) Applicant: TCL CHINA STAR OPTOELECTRONICS TECHNOLOGY CO., LTD., Guangdong (CN)

(72) Inventor: Mingguo Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/600,175

(22) PCT Filed: Aug. 31, 2021

(86) PCT No.: PCT/CN2021/115527
§ 371 (c)(1),
(2) Date: Mar. 11, 2024

(87) PCT Pub. No.: WO2022/237009
PCT Pub. Date: Nov. 17, 2022

(65) Prior Publication Data
US 2024/0280865 A1    Aug. 22, 2024

(30) Foreign Application Priority Data
May 13, 2021 (CN) .......................... 202110521105.1

(51) Int. Cl.
*G02F 1/1343* (2006.01)
*G02F 1/1362* (2006.01)
*G02F 1/1368* (2006.01)

(52) U.S. Cl.
CPC .. *G02F 1/136209* (2013.01); *G02F 1/134309* (2013.01); *G02F 1/136286* (2013.01); *G02F 1/1368* (2013.01)

(58) Field of Classification Search
CPC ........ G02F 1/136209; G02F 1/134309; G02F 1/136286; G02F 1/1368
See application file for complete search history.

(56) References Cited

FOREIGN PATENT DOCUMENTS

| | | |
|---|---|---|
| CN | 102156358 | 8/2011 |
| CN | 103293746 | 9/2013 |
| CN | 105116641 | 12/2015 |
| CN | 107783346 | 3/2018 |
| CN | 107797352 | 3/2018 |
| CN | 111443532 | 7/2020 |
| CN | 111474787 | 7/2020 |
| CN | 113253504 | 8/2021 |
| TW | 200732791 | 9/2007 |

OTHER PUBLICATIONS

CN 108319065 A (Liao, Zuo-Min et al.) machine translation (Year: 2018).*

* cited by examiner

*Primary Examiner* — James A Dudek

(57) ABSTRACT

A display panel and a display device are provided. The display panel includes a display area and a frame area adjacent to the display area. The display panel further includes: an array substrate; a light-shielding electrode, arranged on the array substrate and located in the frame area; and a light-shielding liquid crystal layer, arranged on a side of the light-shielding electrode away from the array substrate and located in the frame area. The light-shielding electrode is configured to control deflection angles of liquid crystals in the light-shielding liquid crystal layer to block light from passing through the frame area.

16 Claims, 5 Drawing Sheets

DISPLAY PANEL AND DISPLAY DEVICE

RELATED APPLICATIONS

This application is a National Phase of PCT Patent Application No. PCT/CN2021/115527 having International filing date of Aug. 31, 2021, which claims the benefit of priority of Chinese Patent Application No. 202110521105.1 filed on May 13, 2021. The contents of the above applications are all incorporated by reference as if fully set forth herein in their entirety.

FIELD AND BACKGROUND OF THE INVENTION

The present disclosure relates to the field of display technology, and in particular, to a display panel and a display device having the display panel.

A thin film transistor-liquid crystal display (TFT-LCD) consists of a color filter (CF) substrate, a thin film transistor (TFT) array substrate, and liquid crystals (LCs) and a sealant sandwiched between the color filter substrate and the thin film transistor array substrate.

There are two display modes for thin film transistor-liquid crystal displays: in-plane switching (IPS) and vertical alignment (VA). The in-plane switching mode is the horizontal alignment of liquid crystals, where the liquid crystal molecules rotate in parallel with the panel during operation to display the image. The vertical alignment mode is the vertical alignment of liquid crystals. When no voltage is applied, the liquid crystal molecules are perpendicular to the two substrates of the screen. When a voltage is applied, the liquid crystal molecules fall down and form a certain angle with the substrate.

At present, because there are circuits distributed in the frame area of the liquid crystal display, and the transmission of electrical signals in the circuits is likely to cause signal interference, the deflection angles of liquid crystals in the frame area will be changed, resulting in light leakage in the frame area of the liquid crystal display, greatly affecting the display effect of the liquid crystal display.

SUMMARY OF THE INVENTION

Technical Problem

Embodiments of the present disclosure provide a display panel and a display device, which can block light from passing through the frame area of the display panel, thereby preventing light leakage in the frame area of the display panel.

Technical Solution

An embodiment of the present disclosure provides a display panel, a display area and a frame area adjacent to the display area,
the display panel further including:
an array substrate;
a light-shielding electrode, arranged on the array substrate and located in the frame area; and
a light-shielding liquid crystal layer, arranged on a side of the light-shielding electrode away from the array substrate and located in the frame area,
wherein the light-shielding electrode is configured to control deflection angles of liquid crystals in the light-shielding liquid crystal layer to block light from passing through the frame area.

In an embodiment of the present disclosure, the display panel further includes a pixel electrode arranged on the array substrate and located in the display area, the pixel electrode includes a first slit, the light-shielding electrode includes a second slit, the second slit is at least located on a side of the light-shielding electrode adjacent to the display area, and an inclination direction of the first slit is the same as an inclination direction of the second slit.

In an embodiment of the present disclosure, the light-shielding electrode and the pixel electrode are formed in a same process.

In an embodiment of the present disclosure, the display panel further includes a color filter substrate located on a side of the light-shielding liquid crystal layer away from the array substrate, the color filter substrate includes a counter electrode arranged opposite to the light-shielding electrode, and the counter electrode cooperates with the light-shielding electrode to control the deflection angles of the liquid crystals in the light-shielding liquid crystal layer to block light from passing through the frame area.

In an embodiment of the present disclosure, the color filter substrate further comprises a common electrode arranged opposite to the pixel electrode, and the counter electrode and the common electrode are integrally formed.

In an embodiment of the present disclosure, the display panel further includes a polarizer stacked with the array substrate, the light-shielding electrode includes a third slit, the third slit is at least located on a side of the light-shielding electrode away from the display area, and an inclination direction of the third slit is parallel to or perpendicular to an optical axis direction of the polarizer.

In an embodiment of the present disclosure, the display panel further includes a circuit area located in the frame area, the array substrate includes a thin film transistor device and a separation layer covering the thin film transistor device, the light-shielding electrode is arranged on the separation layer and at least located in the circuit area, the separation layer includes at least one contact hole located in the circuit area, and an orthographic projection of at least one of the at least one contact hole on the separation layer is located outside an orthographic projection of the light-shielding electrode on the separation layer.

In an embodiment of the present disclosure, the array substrate further includes at least one wiring arranged on the separation layer and located in the circuit area, each of the at least one wiring is electrically connected to the thin film transistor device through the contact hole, and the at least one wiring is spaced apart from the light-shielding electrode.

In an embodiment of the present disclosure, the separation layer includes a first portion located in the circuit area and a second portion located in the display area, and a thickness of the first portion is greater than a thickness of the second portion.

According to the above objective of the present disclosure, a display device is provided. The display device includes a display panel, and the display panel includes a display area and a frame area adjacent to the display area. The display panel further includes:
an array substrate;
a light-shielding electrode, arranged on the array substrate and located in the frame area; and
a light-shielding liquid crystal layer, arranged on a side of the light-shielding electrode away from the array substrate and located in the frame area, wherein the light-shielding electrode is configured to control deflection angles of liquid crystals in the light-shielding liquid crystal layer to block light from passing through the frame area.

In an embodiment of the present disclosure, the display panel further includes a pixel electrode arranged on the array substrate and located in the display area, the pixel electrode includes a first slit, the light-shielding electrode includes a second slit, the second slit is at least located on a side of the light-shielding electrode adjacent to the display area, and an inclination direction of the first slit is the same as an inclination direction of the second slit.

In an embodiment of the present disclosure, the light-shielding electrode and the pixel electrode are formed in a same process.

In an embodiment of the present disclosure, the display panel further includes a color filter substrate located on a side of the light-shielding liquid crystal layer away from the array substrate, the color filter substrate includes a counter electrode arranged opposite to the light-shielding electrode, and the counter electrode cooperates with the light-shielding electrode to control the deflection angles of the liquid crystals in the light-shielding liquid crystal layer to block light from passing through the frame area.

In an embodiment of the present disclosure, the color filter substrate further comprises a common electrode arranged opposite to the pixel electrode, and the counter electrode and the common electrode are integrally formed.

In an embodiment of the present disclosure, the display panel further includes a polarizer stacked with the array substrate, the light-shielding electrode includes a third slit, the third slit is at least located on a side of the light-shielding electrode away from the display area, and an inclination direction of the third slit is parallel to or perpendicular to an optical axis direction of the polarizer.

In an embodiment of the present disclosure, the display panel further includes a circuit area located in the frame area, the array substrate includes a thin film transistor device and a separation layer covering the thin film transistor device, the light-shielding electrode is arranged on the separation layer and at least located in the circuit area, the separation layer includes at least one contact hole located in the circuit area, and an orthographic projection of at least one of the at least one contact hole on the separation layer is located outside an orthographic projection of the light-shielding electrode on the separation layer.

In an embodiment of the present disclosure, the array substrate further includes at least one wiring arranged on the separation layer and located in the circuit area, the wiring is electrically connected to the thin film transistor device through the contact hole, and at least one of the at least one wiring is spaced apart from the light-shielding electrode.

In an embodiment of the present disclosure, the separation layer includes a first portion located in the circuit area and a second portion located in the display area, and a thickness of the first portion is greater than a thickness of the second portion.

Beneficial Effects

Compared with the prior art, in the present disclosure, the light-shielding electrode is arranged on the array substrate at the position corresponding to the frame area to control the deflection angles of the liquid crystals in the light-shielding liquid crystal layer, so as to prevent signal interference caused by generation and transmission of electric signals by a drive circuit in the frame area from causing the deflection angles of the liquid crystals in the light-shielding liquid crystal layer to undergo uncontrollable changes. Therefore, the light-shielding electrode provided in the present disclosure can prevent light from passing through the frame area of the display panel, to prevent leakage of light in the frame area of the display panel, thereby improving the display effect of the display panel.

BRIEF DESCRIPTION OF THE SEVERAL VIEWS OF THE DRAWINGS

The following describes specific implementations of the present disclosure in detail with reference to the accompanying drawings, to make the technical solutions and other beneficial effects of the present disclosure obvious.

DESCRIPTION OF SPECIFIC EMBODIMENTS

Technical solutions in embodiments of the present disclosure are clearly and completely described below with reference to the accompanying drawings in the embodiments of the present disclosure. Apparently, the described embodiments are merely some embodiments rather than all the embodiments of the present disclosure. All other embodiments obtained by a person skilled in the art based on the embodiments of the present disclosure without creative efforts shall fall within the protection scope of the present disclosure.

In the present disclosure, unless otherwise explicitly specified and defined, a first feature being "over" or "below" a second feature may mean that the first feature and the second feature are in direct contact, or the first feature and the second feature are not in direct contact but are in contact through another feature therebetween. In addition, that the first feature is "above", "over", or "on" the second feature may include that the first feature is directly above and obliquely above the second feature, or may merely indicate that the horizontal height of the first feature is higher than that of the second feature. That the first feature is "below", "under", and "beneath" the second feature may include that the first feature is right below the second feature and at an inclined bottom of the second feature, or may merely indicate that the horizontal position of the first feature is lower than that of the second feature.

Many different implementations or examples are provided below to implement different structures of the present disclosure. To simplify the disclosure of the present disclosure, the following describes components and settings of particular examples. Certainly, the components and settings are merely examples, and are not intended to limit the present disclosure. In addition, in the present disclosure, reference numbers and/or reference letters may be repeated in different examples. Such repetition is intended to simplify and clarify the present disclosure, and does not indicate a relationship between various implementations and/or settings that are discussed. In addition, the present disclosure provides examples of various particular processes and materials, but a person of ordinary skill in the art may be aware of application of another process and/or use of another material.

At present, because there are circuits distributed in the frame area of the liquid crystal display, and the transmission of electrical signals in the circuits is likely to cause signal interference, the deflection angles of liquid crystals in the frame area will be changed, resulting in light leakage in the frame area of the liquid crystal display, greatly affecting the display effect of the liquid crystal display.

Figure 1:
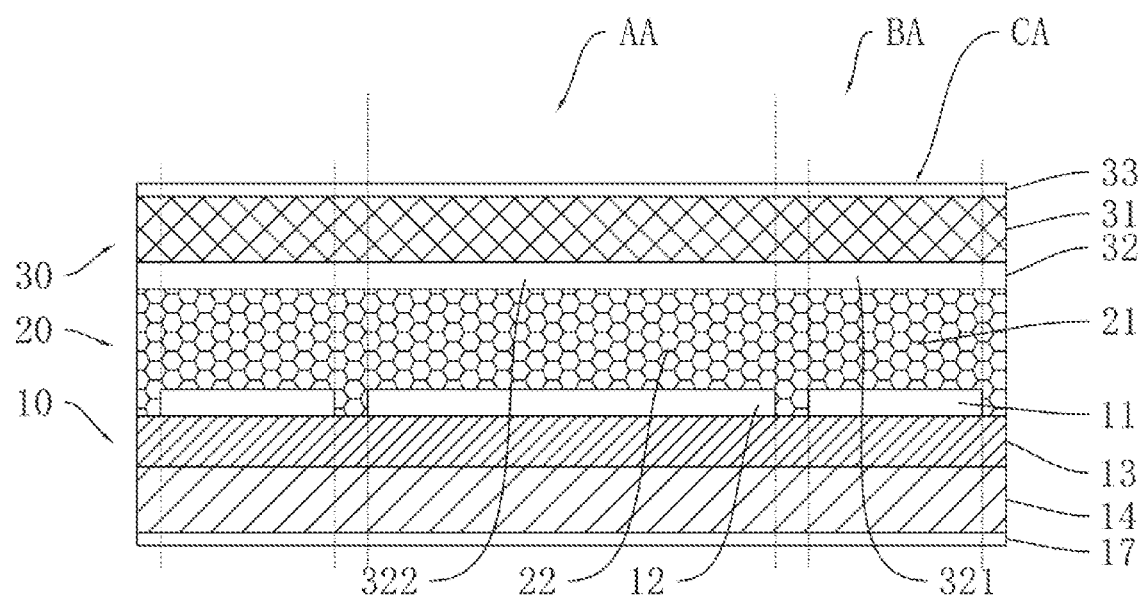
FIG. 1 is a schematic structural diagram of a display panel according to an embodiment of the present disclosure.
Figure 2:
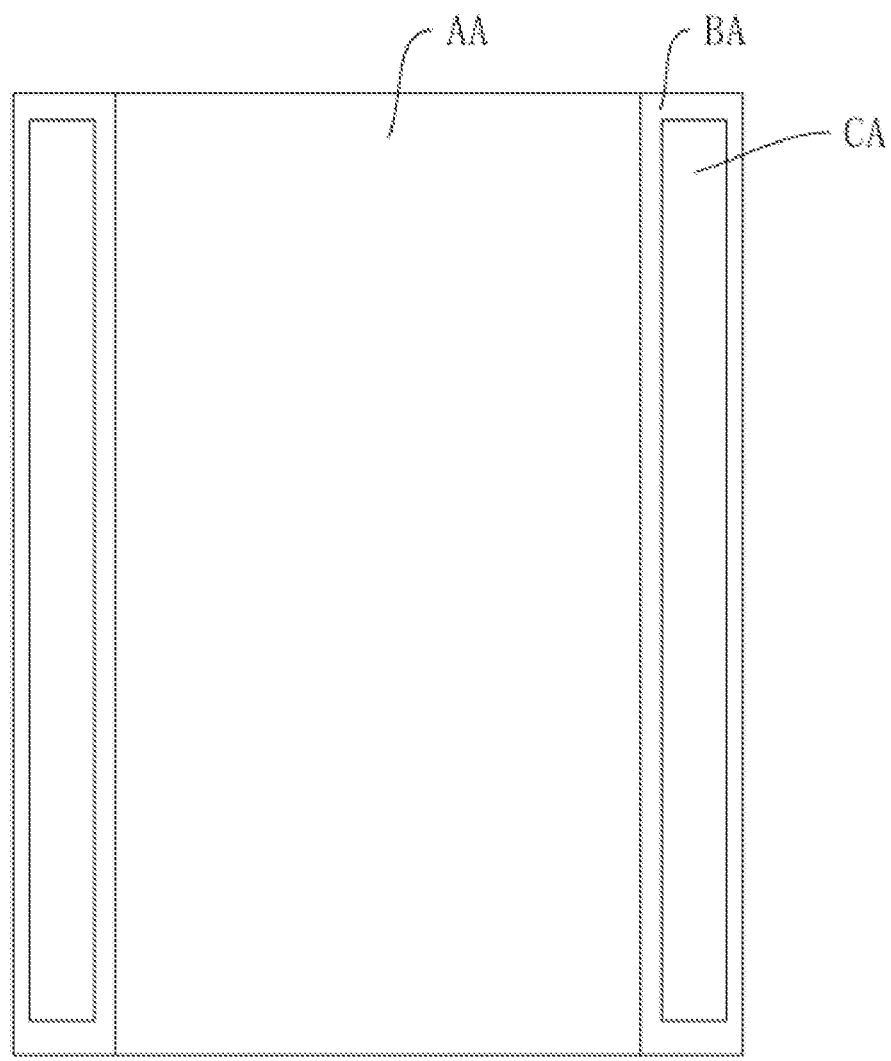
FIG. 2 is a schematic structural diagram of a planar distribution of a display panel according to an embodiment of the present disclosure.

To solve the above technical problems, an embodiment of the present disclosure provides a display panel. Referring to FIG. 1 and FIG. 2, the display panel includes a display area AA and a frame area BA adjacent to the display area AA.

The display panel further includes an array substrate 10, a light-shielding electrode 11 arranged on the array substrate 10, and a light-shielding liquid crystal layer 21 arranged on a side of the light-shielding electrode 11 away from the array substrate 10. The light-shielding electrode 11 is located in the frame area BA, and the light-shielding liquid crystal layer 21 is located in the frame area BA.

Further, the light-shielding electrode 11 is configured to control deflection angles of liquid crystals in the light-shielding liquid crystal layer 21 to block light from passing through the frame area BA.

In practical applications, in the present embodiment of the present disclosure, the light-shielding electrode 11 is arranged on the array substrate 10 at the position corresponding to the frame area BA and is arranged opposite to the light-shielding liquid crystal layer 21 to control the deflection angles of the liquid crystals in the light-shielding liquid crystal layer 21, so as to prevent the liquid crystals in the light-shielding liquid crystal layer 21 from being affected by signal interference from a drive circuit in the frame area BA, and therefore prevent the deflection angles of the liquid crystals in the light-shielding liquid crystal layer 21 from undergoing uncontrollable changes. Therefore, light will not pass through the frame area BA, so that leakage of light in the frame area BA is prevented, thereby improving the display effect of the display panel.

Figure 3:
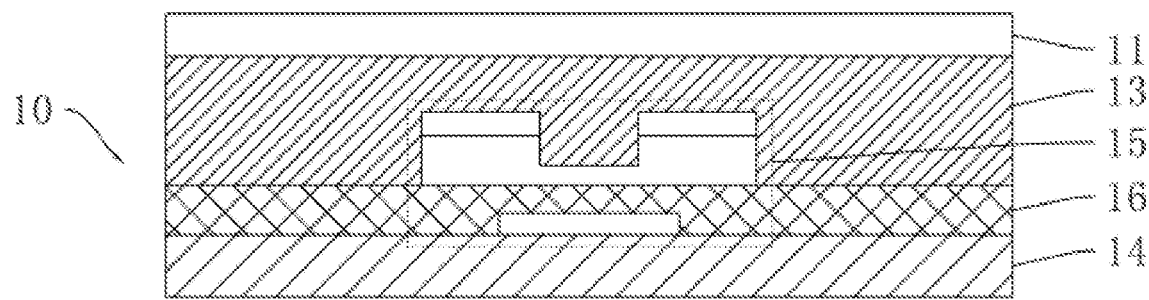
FIG. 3 is a schematic structural cross-sectional view of a corresponding circuit area of a display panel according to an embodiment of the present disclosure.

Specifically, referring to FIG. 1, FIG. 2 and FIG. 3, the display panel includes the display area AA, the frame area BA adjacent to the display area AA, and a circuit area CA located in the frame area BA.

The display panel further includes an array substrate 10 and a color filter substrate 30 arranged opposite to each other, and a liquid crystal layer 20 arranged between the array substrate 10 and the color filter substrate 30.

Further, the array substrate 10 includes a first substrate 14, a buffer layer 16 arranged on a side of the first substrate 14 close to the color filter substrate 30, a separation layer 13 arranged on a side of the buffer layer 16 close to the color filter substrate 30, and a thin film transistor device 15 received in the buffer layer 16 and the separation layer 13.

The color filter substrate 30 includes a second substrate 31 and a common electrode layer 32 arranged on a side of the second substrate 31 facing the array substrate 10.

It should be noted that the figures provided by the embodiments of the present disclosure show only part of structural layers of the array substrate 10, the color filter substrate 30, and the liquid crystal layer 20 in the display panel. In particular, the array substrate 10 further includes a signal line, a contact hole for connecting the signal line and the thin film transistor device 15, and other electrode parts such as a touch electrode and a common electrode, the color filter substrate 30 may further include a color resist layer, a black matrix layer, and the like, the liquid crystal layer 20 may further include spacer pillars, a sealant arranged around the liquid crystal layer 20, and the like. The above structures can be realized by conventional processes, so the details will not be repeated herein.

In an embodiment of the present disclosure, the display panel further comprises a light-shielding electrode 11 arranged on the array substrate 10. The light-shielding electrode 11 is at least located in the circuit area CA. The liquid crystal layer 20 includes a display liquid crystal layer 22 located in the display area AA and the light-shielding liquid crystal layer 21 at least located in the circuit area CA, i.e., the light-shielding electrode 11 can control the deflection angles of the liquid crystals in the light-shielding liquid crystal layer 21, so as to prevent the liquid crystals in the light-shielding liquid crystal layer 21 from being affected by a drive circuit in the circuit area CA, and therefore prevent the deflection angles of the liquid crystals in the light-shielding liquid crystal layer 21 from undergoing uncontrollable changes. Therefore, light will not pass through the frame area BA, so that leakage of light in the frame area BA is prevented, thereby improving the display effect of the display panel.

Optionally, the display liquid crystal layer 22 and the light-shielding liquid crystal layer 21 are integrally formed to form the liquid crystal layer 20. In the embodiments of the present disclosure, for ease of description, corresponding to different areas, the display liquid crystal layer 22 and the light-shielding liquid crystal layer 21 are defined.

For the common electrode layer 32 of the color filter substrate 30, the common electrode layer 32 includes a common electrode 322 located in the display area AA and a counter electrode 321 located in the circuit area CA. The counter electrode 321 and the light-shielding electrode 11 are arranged opposite to each other. The counter electrode 321 and the light-shielding electrode 11 cooperate to control the deflection angles of the liquid crystals in the light-shielding liquid crystal layer 21 to block light from passing through the frame area BA.

Optionally, the counter electrode 321 may also be located in an area outside the circuit area CA, and the counter electrode 321 and the common electrode 322 are integrally formed and can be formed by a same process, which can reduce the number of processes required, thereby reducing the costs.

It should be noted that in practical applications, the light-shielding liquid crystal layer 21 is located between the light-shielding electrode 11 and the counter electrode 321 a first voltage may be applied to the light-shielding electrode 11, a second voltage may be applied to the counter electrode 321, and an electric field may be formed by controlling the values of the first voltage and the second voltage, to control the deflection angles of the liquid crystals in the light-shielding liquid crystal layer 21, so as to prevent light from passing through the frame area BA.

In addition, the display panel further includes a pixel electrode 12 arranged on the array substrate 10. The pixel electrode 12 is located in the display area AA and is arranged opposite to the common electrode 322. Voltages are respectively applied to the pixel electrode 12 and the common electrode 322 to control deflection angles of liquid crystals in the display liquid crystal layer 22, so as to realize a display function of the corresponding display area AA of the display panel.

In this embodiment of the present disclosure, the pixel electrode 12 and the light-shielding electrode 11 are both located on the array substrate 10, and belong to the same structural layer. Optionally, the pixel electrode 12 and the light-shielding electrode 11 are made of the same material by the same process, which can reduce the number of processes required, thereby reducing the costs.

Optionally, the pixel electrode 12 has a first slit, the light-shielding electrode 11 has a second slit, and the second slit is at least located on a side of the light-shielding electrode 11 close to the display area AA. An inclination direction of the first slit is the same as an inclination direction of the second slit. Therefore, when an alignment film is formed on the array substrate 10 and the alignment film is located on the pixel electrode 12 and the light-shielding electrode 11, because the inclination direction of the second slit at least on the side of the light-shielding electrode 11 close to the display area AA is the same as the inclination direction of the first slit of the pixel electrode 12, the first slit of the pixel electrode 12 and the second slit of the light-shielding electrode 11 have the same or similar film morphologies in their corresponding parts in the process of coating the alignment film and the alignment process. In this way, the side of the light-shielding electrode 11 close to the display area AA does not affect the formation of the alignment film in the display area AA, so that the alignment film in the display area AA has uniform alignment, thereby improving the yield rate of the alignment film.

Optionally, the display panel further includes a polarizer 17 stacked with the array substrate 10, the light-shielding electrode 11 further includes a third slit, and the third slit is at least located on a side of the light-shielding electrode 11 away from the display area AA. An inclination direction of the third slit is parallel to or perpendicular to an optical axis direction of the polarizer 17.

It should be noted that the polarizer 17 is located on a side of the array substrate 10 away from the color filter substrate 30, the display panel further includes a counter polarizer 33 stacked with the color filter substrate 30, and the counter polarizer 33 is located on a side of the color filter substrate 30 away from the array substrate 10. The optical axis direction of the polarizer 17 is perpendicular to an optical axis direction of the counter polarizer 33.

In an embodiment of the present disclosure, liquid crystals in the liquid crystal layer 20 are vertical alignment liquid crystals, major axis directions of the liquid crystals are perpendicular to the array substrate 10, the light-shielding electrode 11 has a third slit on at least a side thereof away from the display area AA, and an inclination direction of the third slit is parallel to the optical axis direction of the polarizer 17. A polarization direction of first light passing through the polarizer 17 is a first direction. Because the inclination direction of the third slit is parallel to the optical axis direction of the polarizer 17, major axis directions of the liquid crystals in the light-shielding liquid crystal layer 21 can be better controlled to be parallel to the optical axis direction of the polarizer 17, i.e., the first light is not polarized. In this embodiment, because liquid crystals in the light-shielding liquid crystal layer 21 are vertical alignment liquid crystals, the light-shielding electrode 11 can better control major axis directions of the liquid crystals in the light-shielding liquid crystal layer 21 to remain in a direction perpendicular to the array substrate 10, so that the light-shielding liquid crystal layer 21 does not polarize the first light passing therethrough, i.e., the polarization direction of the first light remains in the first direction. When the first light reaches to one side of the color filter substrate 30, the first light cannot pass through the counter polarizer 33 because the optical axis direction of the counter polarizer 33 is perpendicular to the optical axis direction of the polarizer 17, i.e., perpendicular to the first direction, thereby providing a light-shielding effect.

In another embodiment of the present disclosure, liquid crystals in the liquid crystal layer 20 are horizontal alignment liquid crystals, major axis directions of the liquid crystals are parallel to the array substrate 10, the light-shielding electrode 11 has a third slit on at least a side thereof away from the display area AA, and an inclination direction of the third slit is perpendicular to the optical axis direction of the polarizer 17. A polarization direction of first light passing through the polarizer 17 is a first direction. Because the inclination direction of the third slit is perpendicular to the optical axis direction of the polarizer 17, major axis directions of the liquid crystals in the light-shielding liquid crystal layer 21 can be better controlled to be perpendicular to the optical axis direction of the polarizer 17, i.e., the first light cannot pass through the light-shielding liquid crystal layer 21. In this embodiment, because liquid crystals in the light-shielding liquid crystal layer 21 are horizontal alignment liquid crystals, the light-shielding electrode 11 can better control major axis directions of the liquid crystals in the light-shielding liquid crystal layer 21 to remain in a direction parallel to the array substrate 10, so that the light-shielding liquid crystal layer 21 blocks passage of the first light, thereby providing a light-shielding effect.

It should be noted that in the above two embodiments, the deflection angles of the liquid crystals in the light-shielding liquid crystal layer 21 are controlled not to change, i.e., the deflection angles are 0°, so as to provide a light-shielding effect. Therefore, the first voltage applied to the light-shielding electrode 11 and the second voltage applied to the counter electrode 321 may be made the same or similar to each other, so as to control the deflection angles of the liquid crystals in the light-shielding liquid crystal layer 21 not to change.

In addition, in still another embodiment of the present disclosure, for the light-shielding liquid crystal layer 21 having other types of liquid crystals, the values of the first voltage and the second voltage may be controlled so that major axis directions of the liquid crystals in the light-shielding liquid crystal layer 21 are parallel to or perpendicular to the optical axis direction of the polarizer 17, so as to provide a light-shielding effect.

Further, in an embodiment of the present disclosure, the light-shielding electrode 11 may include only the second slit, or include only the third slit, or include both the second slit and the third slit, which will be described below through specific embodiments.

In an embodiment of the present disclosure, the light-shielding electrode 11 has a second slit, the pixel electrode 12 located in the display area AA has a first slit, and an inclination direction of the second slit is the same as an inclination direction of the first slit, so that the first slit of the pixel electrode 12 and the second slit of the light-shielding electrode 11 have the same or similar film morphologies in their corresponding parts in the process of coating the alignment film and the alignment process. In this way, the light-shielding electrode 11 does not affect the formation of the alignment film in the display area AA, so that the alignment film in the display area AA has uniform alignment, thereby improving the yield rate of the alignment film.

In another embodiment of the present disclosure, the light-shielding electrode 11 has a third slit, and an inclination direction of the third slit is parallel to or perpendicular to the optical axis direction of the polarizer 17, so as to better control the deflection angles of the liquid crystals in the light-shielding liquid crystal layer 21, so that the major axis directions of the liquid crystals in the light-shielding liquid crystal layer 21 are parallel to or perpendicular to the optical axis direction of the polarizer 17, thereby providing a better light-shielding effect.

In still another embodiment of the present disclosure, the light-shielding electrode 11 has a second slit on a side thereof close to the display area AA, and the light-shielding electrode 11 has a third slit on a side thereof away from the display area AA. An inclination direction of the second slit is the same as the inclination direction of the first slit of the pixel electrode 12, and an inclination direction of the third slit is perpendicular to or parallel to the optical axis direction of the polarizer 17. In this way, the light-shielding electrode 11 does not affect the formation of the alignment film in the display area AA, so that the alignment film in the display area AA has uniform alignment. Therefore, the deflection angles of the liquid crystals in the light-shielding liquid crystal layer 21 can be better controlled while improving the yield rate of the alignment film, so that the major axis directions of the liquid crystals in the light-shielding liquid crystal layer 21 are parallel to or perpendicular to the optical axis direction of the polarizer 17, thereby providing a better light-shielding effect.

Figure 4:
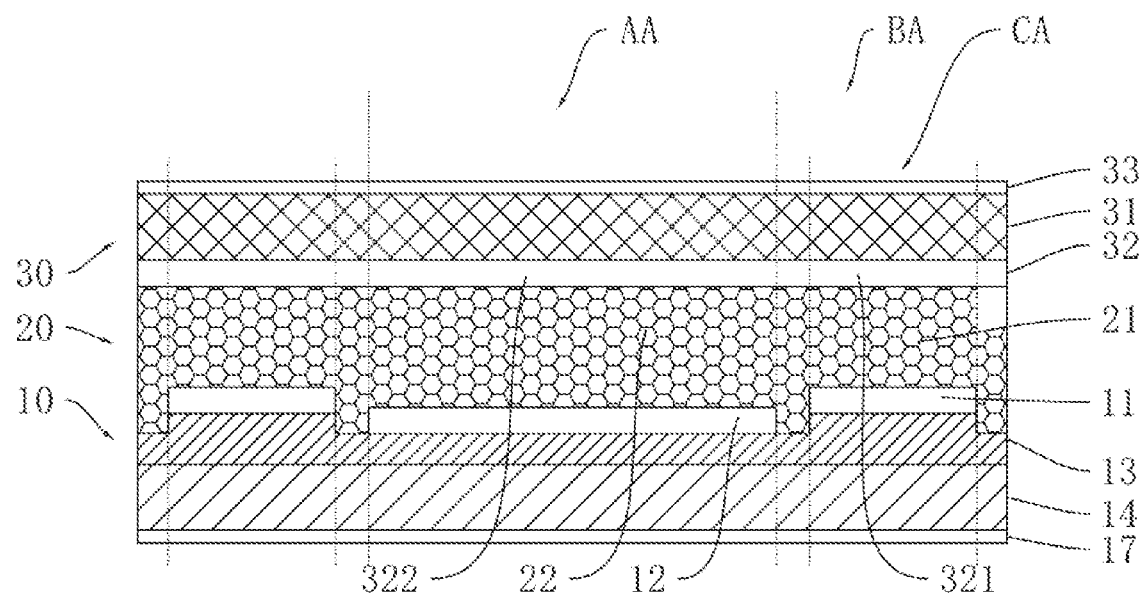
FIG. 4 is a schematic structural diagram of another display panel according to an embodiment of the present disclosure.

In addition, referring to FIG. 4, in an embodiment of the present disclosure, the separation layer 13 includes a first portion located in the frame area BA and a second portion located in the display area AA, and a thickness of the first portion is greater than a thickness of the second portion. Optionally, the thickness of the first portion is greater than or equal to 1.8 μm.

It should be noted that the separation layer 13 further includes a third portion located in an area in the frame area BA other than the circuit area CA, and a thickness of the third portion may be equal to the thickness of the second portion (as shown in FIG. 4) or may be equal to the thickness of the first portion (not shown). In this embodiment of the present disclosure, by increasing the thickness of the separation layer 13 located in the circuit area CA, signal interference between the light-shielding electrode 11 and the thin film transistor device 15 located in the circuit area CA can be reduced, thereby ensuring normal operation of the light-shielding electrode 11 and the thin film transistor device 15.

In some other embodiments of the present disclosure, the thickness of the entire separation layer 13 may also be increased, i.e., the thickness of the separation layer 13 in the display area AA is the same as that in the frame area BA and is greater than or equal to 1.8 μm. In this way, not only signal interference between the light-shielding electrode 11 and the thin film transistor device 15 located in the circuit area CA can be reduced, but also the thickness difference of the film layer is avoided, thereby improving the yield rate of the process for the array substrate 10.

Figure 5:
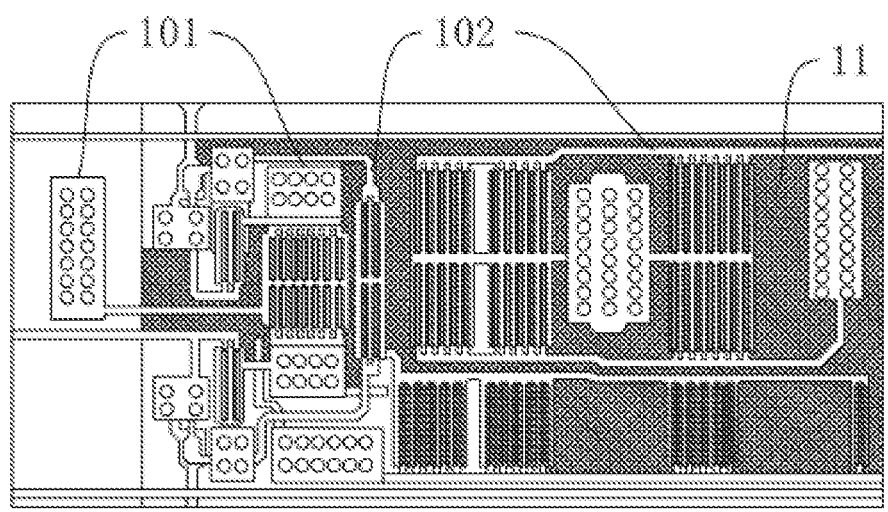
FIG. 5 is a schematic structural cross-sectional view of a corresponding circuit area of a display panel according to an embodiment of the present disclosure.

Further, refer to FIG. 3 and FIG. 5, which are respectively a schematic structural cross-sectional view and a schematic structural plane view of a corresponding circuit area CA of a display panel according to an embodiment of the present disclosure. This embodiment of the present disclosure is described using an example where the circuit area CA is a GOA circuit, i.e., the circuit structure shown in the figure is a GOA drive circuit. The array substrate 10 includes a thin film transistor device 15 and a separation layer 13 covering the thin film transistor device 15, and the light-shielding electrode 11 is arranged on the separation layer 13.

Specifically, the thin film transistor device 15 may be a functional transistor in the GOA drive circuit, for example, a pull-up control switch, a pull-up switch, a pull-down switch, and a pull-down hold switch, and the thin film transistor device 15 is located below the light-shielding electrode 11, covered by the separation layer 13, and insulated from the light-shielding electrode 11.

In addition, the separation layer 13 further includes at least one contact hole 101 located in the circuit area CA, and the array substrate 10 includes at least one wiring 102 arranged on the separation layer 13 and located in the circuit area CA. The wiring 102 is electrically connected to the thin film transistor device 15 through the contact hole 101, to realize the input and output of signals to and from the GOA drive circuit.

In this embodiment of the present disclosure, an orthographic projection of at least one of the at least one contact hole 101 on the separation layer 13 is located outside an orthographic projection of the light-shielding electrode on the separation layer 13, and at least one of the at least one wiring 102 is spaced apart from, i.e., needs to be insulated from, the light-shielding electrode 11. In other words, the light-shielding electrode 11 provided in this embodiment of the present disclosure is arranged in the circuit area CA, does not affect the normal operation of the drive circuit in the circuit area CA, and can also prevent leakage of light from the frame area BA of the display panel.

It should be noted that in this embodiment of the present disclosure, the light-shielding electrode 11 is at least arranged in the circuit area CA, i.e., the light-shielding electrode 11 may be arranged in the circuit area CA, or may be arranged in an area in the frame area BA other than the circuit area CA, or may be arranged corresponding to the entire frame area BA, so as to improve the light-shielding effect.

In addition, a signal line may be connected to the light-shielding electrode 11, so as to apply a voltage to the light-shielding electrode 11. When the frame area BA has a plurality of circuit areas CA, one light-shielding electrode 11 may be arranged for each of the circuit areas CA.

Optionally, a plurality of signal lines may be arranged, and each of the signal lines is correspondingly connected to one light-shielding electrode 11. Each signal line may transmit the same or a different voltage signal. Depending on different drive circuits in the circuit areas CA corresponding to the light-shielding electrodes 11, different voltage signals are transmitted. For example, the voltage signal of the light-shielding electrode 11 corresponding to the drive circuit that generates higher signal interference is different from the voltage signal of the light-shielding electrode 11 corresponding to the drive circuit that generates lower signal interference, so as to ensure that each light-shielding electrode 11 can provide a light-shielding effect.

Optionally, a bridge structure may be arranged between neighboring light-shielding electrodes 11 so as to connect the plurality of light-shielding electrodes 11 to each other, and a voltage signal is input to one of the light-shielding electrodes 11, so that the plurality of light-shielding electrodes 11 all have the voltage signal, so as to control the deflection angles of the liquid crystals in the light-shielding liquid crystal layer 21.

Based on the above, in the present embodiment of the present disclosure, the light-shielding electrode 11 is arranged on the array substrate 10 at the position corresponding to the circuit area CA in the frame area BA and is arranged opposite to the light-shielding liquid crystal layer 21 to control the deflection angles of the liquid crystals in the light-shielding liquid crystal layer 21, so as to prevent the liquid crystals in the light-shielding liquid crystal layer 21 from being affected by signal interference from a drive circuit in the circuit area CA, and therefore prevent the deflection angles of the liquid crystals in the light-shielding liquid crystal layer 21 from undergoing uncontrollable changes. Therefore, light will not pass through the frame area BA, so that leakage of light in the frame area BA is prevented, thereby improving the display effect of the display panel.

According to the above objective of the present disclosure, a display device is provided, including the display panel. In the embodiments of the present disclosure, the light-shielding electrode 11 is arranged in the frame area BA of the display panel, to alleviate the light leakage in the frame area BA of the display panel.

The display device provided in the embodiments of the present disclosure includes a large-size tiled display device, and the display device includes a plurality of display panels. The plurality of display panels are tiled to form the large-size tiled display device. Because the display panel provided in the embodiments of the present disclosure effectively alleviates the light leakage in the frame area BA of the display panel, the display effect of the large-size tiled display device is also improved, and therefore the yield rate is improved.

In the foregoing embodiments, the descriptions of each embodiment have different focuses, and for a part that is not described in detail in an embodiment, reference may be made to the relevant description of other embodiments.

The display panel and the display device provided in the embodiments of the present disclosure are described in detail above. The principles and implementations of the present disclosure are described by using specific examples in this specification, and the descriptions of the embodiments are merely intended to help understand the methods and core ideas of the present disclosure. A person of ordinary skill in the art should understand that modifications may be still made to the technical solutions described in the foregoing embodiments or equivalent replacements may be made to some technical features thereof, as long as such modifications or replacements do not make the essence of corresponding technical solutions depart from the scope of the technical solutions of the embodiments of the present disclosure.

What is claimed is:

1. A display panel, comprising a display area and a frame area adjacent to the display area,
the display panel further comprising:
an array substrate;
a light-shielding electrode disposed on the array substrate and located in the frame area; and
a light-shielding liquid crystal layer disposed on a side of the light-shielding electrode away from the array substrate and located in the frame area,
wherein the light-shielding electrode is configured to control deflection angles of liquid crystals in the light-shielding liquid crystal layer to block light from passing through the frame area;
wherein the display panel further comprises a pixel electrode disposed on the array substrate and located in the display area, the pixel electrode comprises a first slit, the light-shielding electrode comprises a second slit, the second slit is at least located on a side of the light-shielding electrode adjacent to the display area, and an inclination direction of the first slit is the same as an inclination direction of the second slit.

2. The display panel according to claim 1, wherein the light-shielding electrode and the pixel electrode are formed in a same process.

3. The display panel according to claim 1, wherein the display panel further comprises a color filter substrate located on a side of the light-shielding liquid crystal layer away from the array substrate, the color filter substrate comprises a counter electrode arranged opposite to the light-shielding electrode, and the counter electrode cooperates with the light-shielding electrode to control the deflection angles of the liquid crystals in the light-shielding liquid crystal layer to block light from passing through the frame area.

4. The display panel according to claim 3, wherein the color filter substrate further comprises a common electrode arranged opposite to the pixel electrode, and the counter electrode and the common electrode are integrally formed.

5. The display panel according to claim 1, wherein the display panel further comprises a polarizer stacked with the array substrate, the light-shielding electrode comprises a third slit, the third slit is at least located on a side of the light-shielding electrode away from the display area, and an inclination direction of the third slit is parallel to or perpendicular to an optical axis direction of the polarizer.

6. A display panel, comprising a display area and a frame area adjacent to the display area,
the display panel further comprising:
an array substrate;
a light-shielding electrode disposed on the array substrate and located in the frame area; and
a light-shielding liquid crystal layer disposed on a side of the light-shielding electrode away from the array substrate and located in the frame area,
wherein the light-shielding electrode is configured to control deflection angles of liquid crystals in the light-shielding liquid crystal layer to block light from passing through the frame area;
wherein the display panel further comprises a circuit area located in the frame area, the array substrate comprises a thin film transistor device and a separation layer covering the thin film transistor device, the light-shielding electrode is arranged on the separation layer and at least located in the circuit area, the separation layer comprises at least one contact hole located in the circuit area, and an orthographic projection of at least one of the at least one contact hole on the separation layer is located outside an orthographic projection of the light-shielding electrode on the separation layer.

7. The display panel according to claim 6, wherein the array substrate further comprises at least one wiring arranged on the separation layer and located in the circuit area, each of the at least one wiring is electrically connected to the thin film transistor device through the contact hole, and the at least one wiring is spaced apart from the light-shielding electrode.

8. The display panel according to claim 6, wherein the separation layer comprises a first portion located in the circuit area and a second portion located in the display area, and a thickness of the first portion is greater than a thickness of the second portion.

9. A display device, wherein the display device comprises a display panel comprising a display area and a frame area adjacent to the display area,
the display panel further comprising:
an array substrate;
a light-shielding electrode, arranged on the array substrate and located in the frame area; and a light-shielding liquid crystal layer, arranged on a side of the light-shielding electrode away from the array substrate and located in the frame area,
wherein the light-shielding electrode is configured to control deflection angles of liquid crystals in the light-shielding liquid crystal layer to block light from passing through the frame area;
wherein the display panel further comprises a pixel electrode arranged on the array substrate and located in the display area, the pixel electrode comprises a first slit, the light-shielding electrode comprises a second slit, the second slit is at least located on a side of the light-shielding electrode adjacent to the display area, and an inclination direction of the first slit is the same as an inclination direction of the second slit.

10. The display device according to claim 9, wherein the light-shielding electrode and the pixel electrode are formed in a same process.

11. The display device according to claim 9, wherein the display panel further comprises a color filter substrate located on a side of the light-shielding liquid crystal layer away from the array substrate, the color filter substrate comprises a counter electrode arranged opposite to the light-shielding electrode, and the counter electrode cooperates with the light-shielding electrode to control the deflection angles of the liquid crystals in the light-shielding liquid crystal layer to block light from passing through the frame area.

12. The display device according to claim 11, wherein the color filter substrate further comprises a common electrode arranged opposite to the pixel electrode, and the counter electrode and the common electrode are integrally formed.

13. The display device according to claim 9, wherein the display panel further comprises a polarizer stacked with the array substrate, the light-shielding electrode comprises a third slit, the third slit is at least located on a side of the light-shielding electrode away from the display area, and an inclination direction of the third slit is parallel to or perpendicular to an optical axis direction of the polarizer.

14. The display device according to claim 9, wherein the display panel further comprises a circuit area located in the frame area, the array substrate comprises a thin film transistor device and a separation layer covering the thin film transistor device, the light-shielding electrode is arranged on the separation layer and at least located in the circuit area, the separation layer comprises at least one contact hole located in the circuit area, and an orthographic projection of at least one of the at least one contact hole on the separation layer is located outside an orthographic projection of the light-shielding electrode on the separation layer.

15. The display device according to claim 14, wherein the array substrate further comprises at least one wiring arranged on the separation layer and located in the circuit area, the wiring is electrically connected to the thin film transistor device through the contact hole, and the at least one wiring is spaced apart from the light-shielding electrode.

16. The display device according to claim 14, wherein the separation layer comprises a first portion located in the circuit area and a second portion located in the display area, and a thickness of the first portion is greater than a thickness of the second portion.

* * * * *